(12) United States Patent
Lana

(10) Patent No.: US 10,947,892 B2
(45) Date of Patent: Mar. 16, 2021

(54) SYSTEM, METHOD, AND APPARATUS FOR THROTTLED ENGINE CONTROL USING TURBOCHARGER WASTEGATE

(71) Applicant: Cummins Inc., Columbus, IN (US)

(72) Inventor: Carlos Alcides Lana, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 16/374,121

(22) Filed: Apr. 3, 2019

(65) Prior Publication Data

US 2019/0226392 A1 Jul. 25, 2019

Related U.S. Application Data

(63) Continuation of application No. PCT/US2016/055660, filed on Oct. 6, 2016.

(51) Int. Cl.
| | |
|---|---|
| *F02B 37/18* | (2006.01) |
| *F02D 41/00* | (2006.01) |
| *F02D 41/14* | (2006.01) |
| *F02M 26/04* | (2016.01) |
| *F02M 26/05* | (2016.01) |

(Continued)

(52) U.S. Cl.
CPC ............ *F02B 37/186* (2013.01); *F02B 37/18* (2013.01); *F02D 23/00* (2013.01); *F02D 41/0007* (2013.01); *F02D 41/1448* (2013.01); *F02M 26/04* (2016.02); *F02M 26/05* (2016.02); *F02D 41/0072* (2013.01); *F02D 41/1445* (2013.01); *F02D 2041/1433* (2013.01); *F02D 2250/34* (2013.01); *F02M 26/10* (2016.02); *Y02T 10/12* (2013.01)

(58) Field of Classification Search
CPC ...... F02B 37/18; F02B 37/183; F02B 37/186; F02M 26/04; F02M 26/05; F02M 26/10; F02D 23/00; F02D 41/0007; F02D 41/1444; F02D 41/1445; F02D 41/1446; F02D 41/1447; F02D 41/1448; F02D 41/145; F02D 41/0072; F02D 2041/1443; F02D 2250/34

See application file for complete search history.

(56) References Cited

U.S. PATENT DOCUMENTS

| | | | |
|---|---|---|---|
| 5,203,311 A * | 4/1993 | Hitomi | F02M 26/03 |
| | | | 60/605.2 |
| 6,729,315 B2 | 5/2004 | Onodera et al. | |
| 7,426,828 B2 | 9/2008 | Carbonne et al. | |

(Continued)

FOREIGN PATENT DOCUMENTS

JP 200825515 2/2008

OTHER PUBLICATIONS

International Search Report and Written Opinion, PCT Appln. No. PCT/US16/55660, dated Dec. 29, 2016.

*Primary Examiner* — Jesse S Bogue
*Assistant Examiner* — Loren C Edwards
(74) *Attorney, Agent, or Firm* — Taft Stettinius & Hollister LLP

(57) ABSTRACT

Systems, methods and apparatus are disclosed for producing a target pressure differential across an intake air throttle of an internal combustion engine by opening or closing a turbocharger wastegate to a commanded position that provides an opening through the wastegate having an effective area based on the target pressure differential.

20 Claims, 4 Drawing Sheets

(51) Int. Cl.
*F02D 23/00* (2006.01)
*F02M 26/10* (2016.01)

(56) References Cited

U.S. PATENT DOCUMENTS

| | | |
|---|---|---|
| 7,434,397 B2 | 10/2008 | Hasegawa |
| 7,770,392 B2 | 8/2010 | Birkner et al. |
| 7,905,135 B2 | 3/2011 | Nakano et al. |
| 8,103,428 B2 | 1/2012 | Russ et al. |
| 8,453,446 B2 | 6/2013 | Onishi et al. |
| 8,549,900 B2 | 10/2013 | Nakada |
| 9,004,043 B2 | 4/2015 | Tanaka |
| 2014/0034026 A1 | 2/2014 | Katsumata et al. |
| 2014/0260241 A1 | 9/2014 | Jankovic et al. |
| 2014/0301831 A1* | 10/2014 | Koike .................. F02B 37/183 415/148 |
| 2015/0184587 A1 | 7/2015 | Komiya et al. |
| 2016/0201589 A1* | 7/2016 | Aoyagi ............... F02D 41/1477 701/108 |
| 2016/0215684 A1 | 7/2016 | Hofmann |
| 2016/0215685 A1* | 7/2016 | Flavin .................. F02B 37/183 |

\* cited by examiner

SYSTEM, METHOD, AND APPARATUS FOR THROTTLED ENGINE CONTROL USING TURBOCHARGER WASTEGATE

CROSS-REFERENCE TO RELATED APPLICATION

The present application is a continuation of PCT Application No. PCT/US16/55660 filed on Oct. 6, 2016, which is incorporated herein by reference

BACKGROUND

Turbochargers have been used on internal combustion engines to utilize energy present in the exhaust gas to compress intake air to the engine and increase the intake gas (charge) density to the engine. An ordinary turbocharger has a single operating relationship between the exhaust gas conditions and the energy transfer from the turbine side to the compressor side of the turbocharger. A wastegate (WG) turbocharger includes a valve with that allows some exhaust gas to bypass the turbine depending on whether the valve is opened or closed. The valve is typically connected to an electronic, pneumatic, or electro-pneumatic actuator that allows the valve to be positioned independently of engine operation.

By controlling the amount of exhaust gas that bypasses the turbine, the wastegate position can control boost, exhaust gas recirculation (EGR) flow, reduce NOx output of the engine, reduce pumping work of the engine, and improve torque response, among other outputs. However, current techniques for affecting engine operating conditions based on wastegate positioning suffer various drawbacks and shortcomings due to the control techniques employed in determining the wastegate positioning. Therefore, further technological developments are desirable in this area.

SUMMARY

Unique systems, methods and apparatus are disclosed for providing a target pressure differential across an intake air throttle of an internal combustion engine (i.e. the engine boost or torque reserve) by controlling a turbocharger wastegate to a commanded position that provides an opening through the wastegate with an effective area that is based on the target pressure differential.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
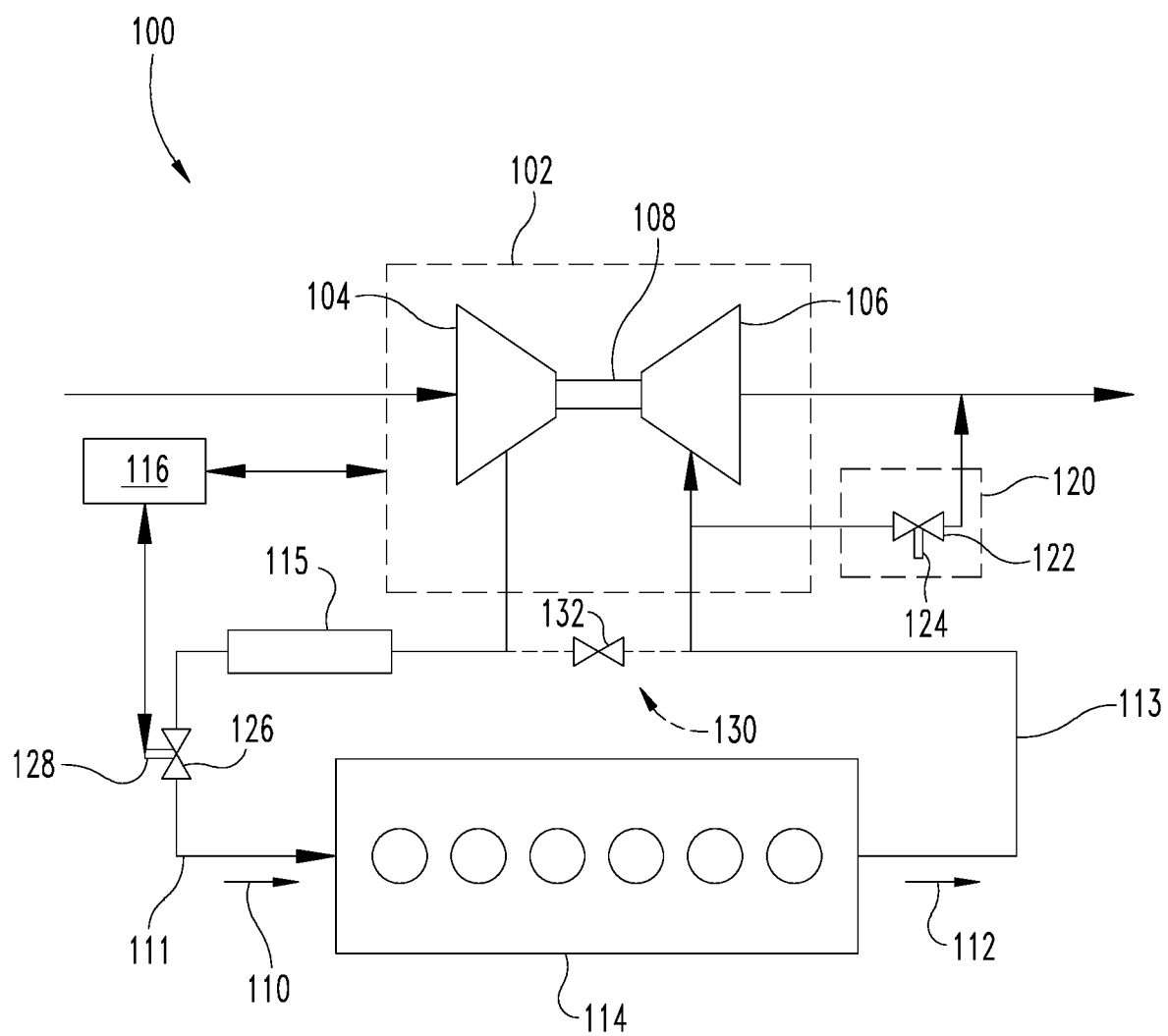
FIG. 1 is a schematic diagram of a system including an intake air throttle and a turbocharger with a wastegate.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 for controlling a turbocharger 102 is schematically depicted. The system 100 includes an internal combustion engine 114 which may be an engine of any type, including at least a compression ignition engine, a spark ignition engine, a diesel engine, a gasoline engine, a natural gas engine, and combinations of these. The engine 114 emits exhaust gases 112 which flow to the turbocharger 102 in an exhaust conduit 113, and transfer a portion of the kinetic and/or thermodynamic energy of the exhaust gases to the turbine 106 of the turbocharger 102. The transferred energy passes through a shaft 108 of the turbocharger 102 to a compressor 104 of the turbocharger 102. Compressor 104 provides compressed intake air 110 to engine 114 with an intake conduit 111.

The compressed intake air 110 is sometimes called charge air, charge gases, charge flow, intake air, or other terms, none of which are limiting. The compressed intake air 110 may pass through a charge air cooler 115 before being received by the engine 114. The charge air cooler 115 helps provide for increased air density for the intake air 110 in the engine 114, although the cooling reduces the pressure of the compressed intake air 110. The presence and operations of a charge air cooler, if present, are well understood and not important to the operations of the turbocharger 102.

Intake conduit 111 further includes an intake air throttle 126 that controls the charge flow to the intake of engine 114. Intake air throttle 126 can include a throttle actuator 128 connected to a controller 116 that controls an opening and closing of intake throttle 126 to provide a desired intake air flow amount to the intake of engine 114.

Certain features such as an intake manifold, an exhaust manifold, an exhaust throttle, an air filter, an intake air heater, and/or a compressor bypass valve, may be present or not in system 100. The presence and operations of such features are not depicted to enhance the clarity of the description.

The turbocharger 102 includes a wastegate 120 that allows exhaust gases 112 to bypass turbine 106. Wastegate 120 includes a WG valve 122 operably connected to a controllable WG actuator 124 that is operable to open and close WG valve 122 to control the size of the opening of wastegate 120 in response to one or more wastegate actuator position commands from controller 116.

In one embodiment, system 100 includes an exhaust gas recirculation (EGR) flow path 130 which fluidly couples the engine exhaust side to the engine intake side. The EGR flowpath 130 may fluidly couple the exhaust manifold to the intake manifold, or any other portion of the exhaust system to any other portion of the intake system. The EGR flowpath 130 may include an EGR valve 132 in the example, although the EGR flowpath 130 may additionally or alternatively include an EGR cooler (not shown) and may further include EGR cooler bypass (not shown.) The EGR flowpath 130 may couple to the intake system at a position upstream or downstream of charge air cooler 115, and upstream or downstream of intake air throttle 126. The depicted EGR flowpath 130 in the system 100 is a "high pressure" EGR system, coupling the exhaust system upstream of the turbine 106 to the intake system downstream of the compressor 104. However, the EGR flowpath 130, where present, may be additionally or alternatively a low pressure EGR system coupling the exhaust system downstream of the turbine 106 to the intake system upstream of the compressor 104. The presence and type of EGR system and EGR components present is entirely optional and not limiting to the present disclosure.

The system 100 includes controller 116 structured to perform certain operations to control the wastegate 120. In certain embodiments, the controller 116 forms a portion of a processing subsystem including one or more computing devices having memory, processing, and communication hardware. The controller may be a single device or a distributed device, and the functions of the controller may be performed by hardware and/or by a computer executing instructions stored in non-transient memory on one or more computer readable media.

In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or by a computer executing instructions stored in non-transient memory on one or more computer readable media, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any module or controller described herein that would be understood by one of skill in the art is contemplated herein. The modules and controllers herein, once the operations are described, are capable of numerous hardware and/or computer based implementations, many of the specific implementations of which involve mechanical steps for one of skill in the art having the benefit of the disclosures herein and the understanding of the operations of the modules and the controllers provided by the present disclosure. More specific descriptions of certain embodiments of controller operations are included in the section referencing FIG. 2.

Certain operations described herein include operations to interpret or determine one or more parameters. Interpreting or determining, as utilized herein, includes an operation to have the value made available by any method known in the art, including at least receiving the value from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any method known in the art (e.g. from an operator input), receiving a value by which the interpreted or determined parameter can be calculated, and/or by referencing a default value that is interpreted or determined to be the parameter value.

Figure 2:
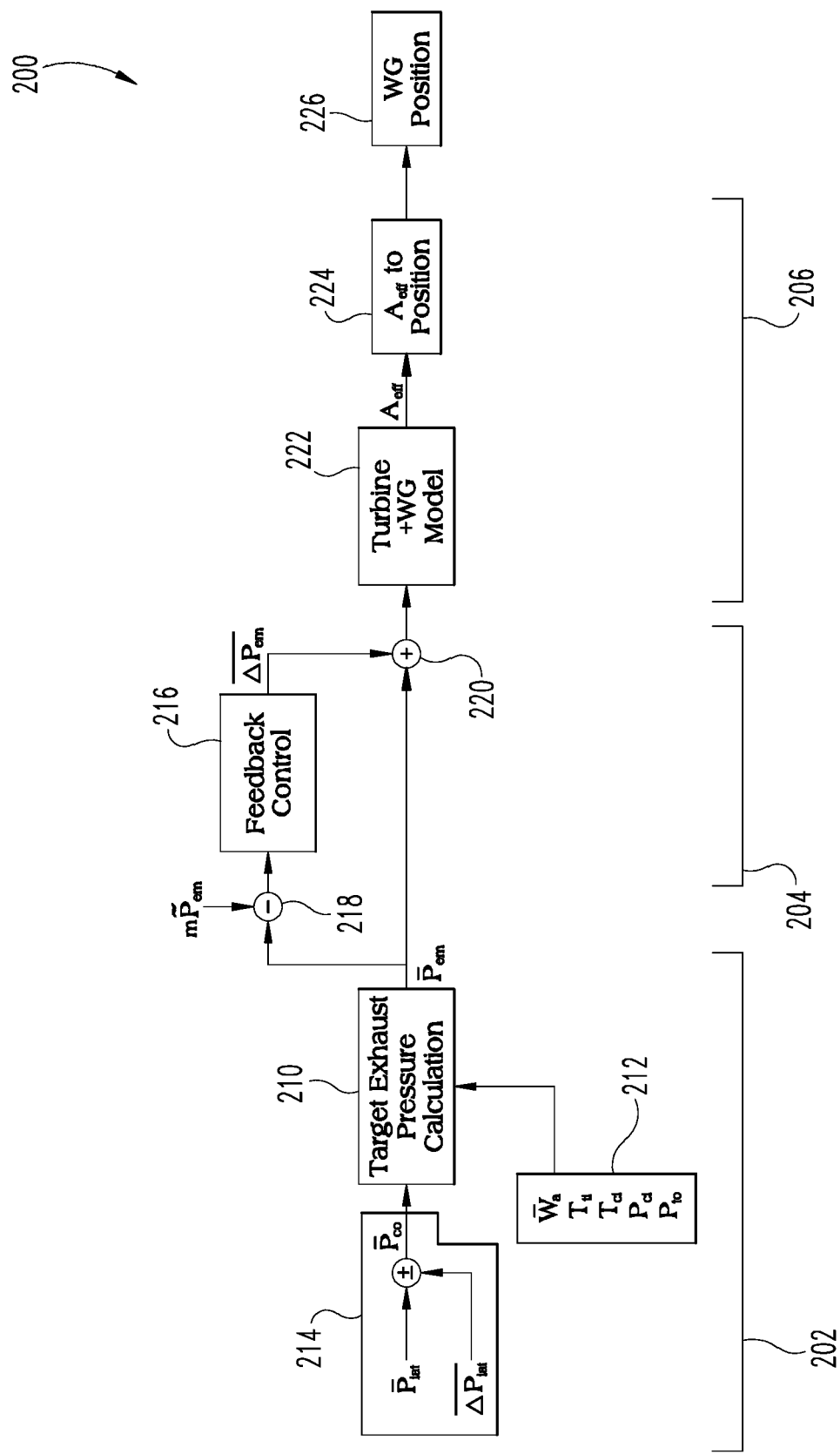
FIG. 2 is a schematic diagram of a processing subsystem for controlling the wastegate of the turbocharger.

FIG. 2 is a schematic illustration of a processing subsystem 200 including controller 116. The example processing subsystem 200 for controller 116 includes a reference generation module 202, a feedback control module 204, and a wastegate positioning module 206. Other modules may also be present, and the described modules may be combined, or further separated into additional modules, and are not limited to the described modules.

The reference generation module 202 includes a target exhaust pressure calculation 210 that receives various turbocharger inputs 212 associated with system 100. Target exhaust pressure calculation 210 can be one or more of a table, a polynomial, or a physical model. Turbocharger inputs 212 include a target or reference intake air flow value $W_a$, a measured, estimated/calculated and/or actual turbine inlet temperature $T_{ti}$ of turbine 106, a measured or actual compressor inlet temperature $T_{ci}$ of compressor 104, a measured or actual compressor inlet pressure $P_{ci}$ of compressor 104, and a measured or actual turbine outlet pressure $P_{to}$ of turbine 106. Intake air flow value $W_a$ can include at least one of an intake air flow, a charge flow and an exhaust gas recirculation flow to the internal combustion engine. Turbocharger inputs 212 may also include an intake air throttle position of intake air throttle 126.

Target exhaust pressure calculation 210 further receives intake reference inputs 214. Intake reference inputs 214 include a reference or target compressor outlet pressure value $P_{co}$ that is determined from a reference or target intake air pressure $P_{iat}$ downstream of intake air throttle 126 and a reference or target intake air throttle pressure differential $\Delta P_{iat}$. The target exhaust pressure calculation 210 is configured to process turbocharger inputs 212 and intake reference inputs 214 and determine a reference or target exhaust manifold pressure $P_{em}$.

Feedback module 204 receives the target exhaust manifold pressure $P_{em}$ and a measured or actual exhaust manifold pressure $mP_{em}$ and provides these values to an operator 218 at an input to a feedback control processer 216. An exhaust manifold pressure difference $\Delta P_{em}$ between the target exhaust manifold pressure $P_{em}$ and the measured exhaust manifold pressure $mP_{em}$ can then be determined by feedback control processer 216. The exhaust manifold pressure difference $\Delta P_{em}$ and the target exhaust manifold pressure $P_{em}$ are provided to operator 220 to sum the target exhaust manifold reference $P_{em}$ and the exhaust manifold pressure difference $\Delta P_{em}$ to provide an exhaust manifold pressure correction to wastegate positioning module 206.

Wastegate positioning module 206 includes a turbine/WG model 222 and a wastegate effective area reference 224. Turbine/WG model 222 receives the exhaust manifold pressure correction from operator 220 and determines a target effective area $A_{eff}$ of the opening in the turbine bypass to be provided by wastegate 120 to provide the exhaust manifold pressure correction and produce the target exhaust manifold pressure $P_{em}$. Wastegate positioning module 206 receives a modified target exhaust pressure calculation and calculates a WG position that provides target effective area $A_{eff}$ that can be defined as a valve position, effective area, or other condition.

In one embodiment of the wastegate positioning module 206, the target exhaust pressure, target exhaust gas flow and target exhaust gas temperature are used to determine the combined turbine and WG effective area. Since the turbine effective area is nearly constant, $A_{eff}$ can be mapped to a position or effective area of the WG. The implementation of the WG 120 can be such that full control of its position is possible, and the WG target effective area $A_{eff}$ can be mapped to a WG actuator position command. For example, if WG actuator 124 is implemented as a pneumatic actuator, the WG target effective area $A_{eff}$ can be used as one of the inputs to command the pneumatic force acting on the WG mechanism.

Figure 3:
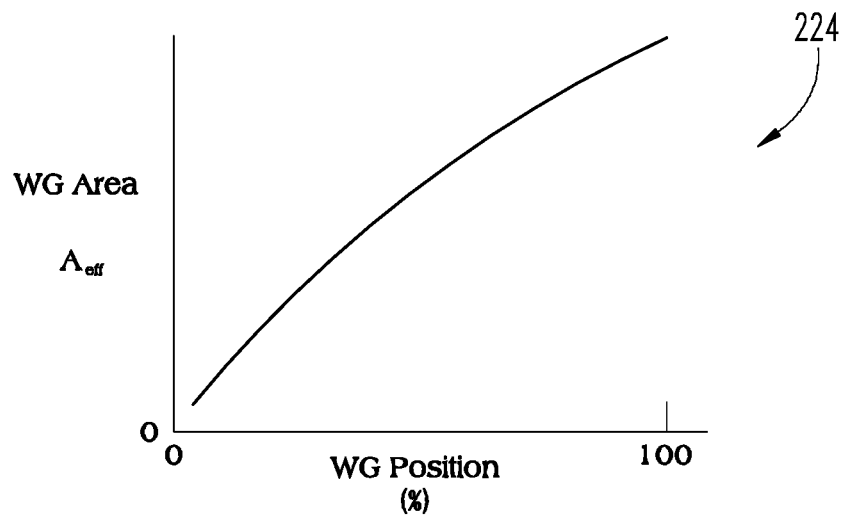
FIG. 3 is an example graph of wastegate positions versus the effective area of opening of the wastegate at the wastegate positions.

The target effective area $A_{eff}$ is provided to the wastegate effective area reference 224, which determines a wastegate actuator position command 226 that controls actuator 124 to position wastegate valve 122 to the position that provides the target effective area $A_{eff}$ of the wastegate opening in the turbine bypass. For example, as shown in FIG. 3, an example reference 224 is provided in which WG position is plotted along the x-axis as an opening percentage of the wastegate valve 122. As the opening amount of wastegate valve 122 increases, the effective area $A_{eff}$ of the opening provided by the wastegate valve 122 in the turbine bypass increases. Thus, controller 116 determines the target effective area $A_{eff}$ and selects a wastegate (WG) position with a percentage opening of valve 122 that provides the target effective area $A_{eff}$. As a result, the pressure at the outlet of compressor 104 and thus the pressure differential across intake air throttle 126 are driven toward the target intake air throttle pressure differential $\Delta P_{iat}$ and the target compressor outlet pressure $P_{co}$, which in turn drives the exhaust manifold pressure toward the target exhaust manifold pressure $P_{em}$.

In one embodiment, the target exhaust pressure calculation 210 can be based on the turbine and compressor efficiency, flow, and power equilibrium equations. The turbine expansion ratio can be shown to be approximated as a function of:

$$\frac{P_{ti}}{P_{to}} = f\left(\frac{P_{co}}{P_{ci}}, \frac{Flow_{cmp}}{P_{ci}}\sqrt{T_{ci}}, \frac{T_{ti}}{T_{ci}}\right) \quad \text{Equation 1}$$

where $Flow_{cmp}$ is the flow through the compressor 104. The target exhaust manifold reference $P_{em}$ can be assumed to be equal to the turbine inlet pressure $P_{ti}$. Using the target exhaust pressure calculation 210 in Equation 1, the turbine inlet pressure $P_{ti}$ (exhaust manifold pressure) is determined in Equation 2 by:

$$P_{ti} = f\left(\frac{P_{im} + \Delta P_{iat}}{P_{ci}}, \frac{Flow_{cmp}}{P_{ci}}\sqrt{T_{ci}}, \frac{T_{ti}}{T_{ci}}\right) * P_{to} \quad \text{Equation 2}$$

where the compressor outlet pressure $P_{co}$ is replaced with the sum of the intake manifold pressure $P_{im}$ and the intake air throttle pressure differential $\Delta P_{iat}$ from the intake air throttle.

The position of the wastegate 120 is used to control the exhaust manifold pressure. However, the wastegate position cannot be determined solely as a function of the target exhaust manifold pressure $P_{em}$. Furthermore, the sensitivity of the exhaust manifold pressure to a change in wastegate position can change significantly depending on operating conditions. Therefore, the turbine/WG model models the turbine and wastegate as a variable orifice as follows:

$$W_t = (A_{eg}(WG) + A_t) * \frac{P_{em}}{\sqrt{RT_{em}}} \sqrt{1 - \frac{P_{to}}{P_{em}}} \quad \text{Equation 3}$$

The total effective area A(WG) of the wastegate is the sum of the area of the opening provided by the wastegate position $A_{eg}$(WG) and the area of the opening provided by the turbine $A_t$. A(WG) can be obtained from the exhaust gas flow $W_t$ through the turbine 106, the exhaust manifold pressure $P_{em}$, the gas constant R, the exhaust manifold temperature $T_{em}$ and the turbine outlet pressure $P_{to}$ as follows:

$$A(WG) = (A_{eg}(WG) + A_t) = \frac{W_t}{\frac{P_{em}}{\sqrt{RT_{em}}}\sqrt{1 - \frac{P_{to}}{P_{em}}}} \quad \text{Equation 4}$$

Furthermore, the relation between the total effective area A(WG) of the wastegate 120 and turbine opening $A_t$, and/or the effective area $A_{eff}$ of opening through the wastegate valve 122 provided by the wastegate position WG, can be determined by test data and stored in controller 116 to, for example, relate a percentage or amount of opening or closing of wastegate valve 122 to the effective area $A_{eff}$ as discussed above. The wastegate actuator position command WG 226 that provides the target effective area $A_{eff}$ is determined controller 116. Controller 116 issues the WG position actuator command 226 to wastegate actuator 124 to position wastegate valve 122 in the desired position.

Control of engine 114 generally operates from a previously known charge or intake air flow target value (e.g., mass flow of air or combined air and EGR flow at the engine inlet) which may be provided by an engine controller (not shown). The engine controller may operate on the same device, or be a separate device, as the controller 116. The target compressor outlet pressure value $P_{co}$ can be calculated from the target intake manifold pressure $P_{iat}$ (or other target intake pressure downstream of intake air throttle 126 and upstream of the cylinders of engine 114) and the target intake air throttle pressure differential $\Delta P_{iat}$. Additionally or alternatively, the target intake air throttle pressure differential $\Delta P_{iat}$ can be a direct input to the controller 116 provided from, for example, an engine controller.

The schematic flow diagrams and related descriptions which follow provide illustrative embodiments of performing procedures for controlling a wastegate position in response to a pressure differential across an intake air throttle to provide the desired or requested engine boost or torque reserve. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product includes instructions causing the computer to execute one or more of the operations, or to issue commands to other devices to execute one or more of the operations.

Figure 4:
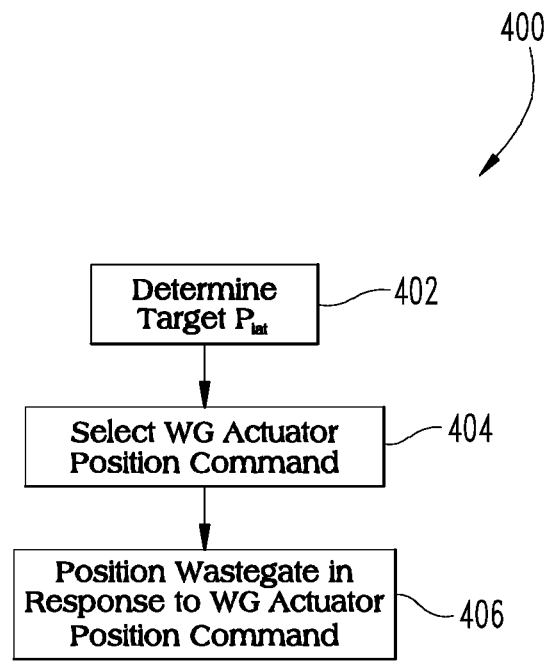
FIG. 4 is a flow diagram of a procedure for controlling a position of the wastegate of the turbocharger.

An example procedure 400 in FIG. 4 includes an operation 402 to interpret or determine a target intake air throttle pressure differential and an operation 404 to select a wastegate actuator position command that results in a target effective area of wastegate opening to provide the target intake air throttle pressure differential. The example procedure further includes an operation 406 to position the wastegate in response to the wastegate actuator position command. This operation can be as direct as sending the position command to the WG actuator 124 or calculating a pneumatic valve command to generate necessary pneumatic force to move the WG valve 122 to the target position.

In one embodiment of procedure 400, an operation is provided to determine a target exhaust manifold pressure based on the target intake air throttle pressure differential, and to determine an exhaust manifold pressure correction by operating a feedback controller on the target exhaust manifold pressure and an actual exhaust manifold pressure. The wastegate actuator position command is selected to provide the exhaust manifold pressure correction that is based on the target intake air throttle pressure differential. In yet another embodiment of procedure 400, the target exhaust pressure can be modified based on EGR flow/fraction or EGR valve position if the current engine pressure drop is not sufficient to drive the require EGR flow.

In another embodiment of procedure 400, the target effective area of the wastegate is based on a knock indicator since higher pressures increase residuals and that tends to increase knock. In another embodiment of procedure 400, the system lacks an intake air throttle and the outlet pressure target of the compressor is the intake manifold pressure target based on the desired charge flow.

Another embodiment procedure includes an operation to determine the wastegate actuator position command by selecting the wastegate actuator position command from a number of wastegate actuator position command solution values. Example operations to select the wastegate actuator position command from the number of wastegate actuator position command solution values include selecting a wastegate actuator position command that provides a target effective area for exhaust flow through the wastegate, and selecting a wastegate actuator position command that is closest to a target effective area for exhaust flow through the wastegate.

Figure 5:
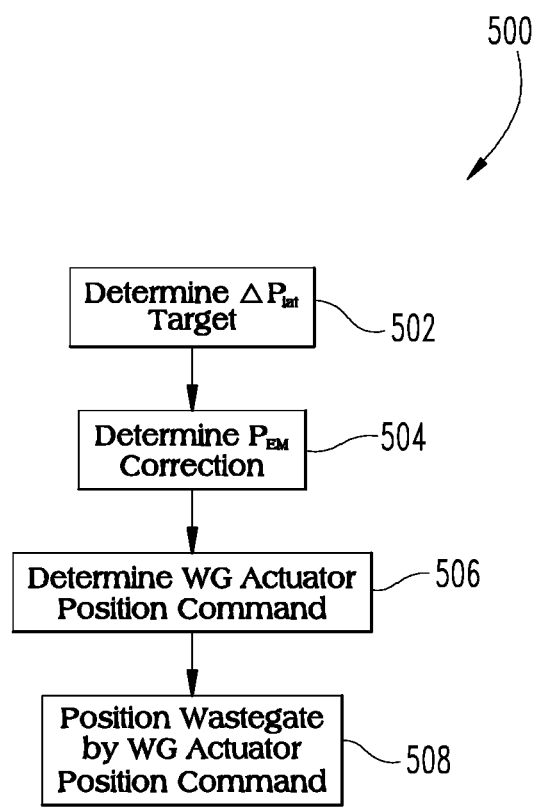
FIG. 5 is a diagram of another embodiment procedure for controlling a position of the wastegate of the turbocharger.

Another example procedure 500 shown in FIG. 5 is set forth as follows. The example procedure include an operation 502 to determine a target intake air throttle pressure differential target and an operation 504 to determine an exhaust manifold pressure correction in response to the target intake air throttle pressure differential, a target exhaust manifold pressure, and an actual exhaust manifold pressure. The procedure 500 further includes, in response to the exhaust manifold pressure correction, an operation 506 to determine a turbocharger wastegate actuator position command that corresponds to a target effective area of opening of the wastegate to provide the exhaust manifold pressure correction. Procedure 500 continues at an operation 508 to position the wastegate in response to the wastegate actuator position command.

The target intake air throttle pressure differential may be determined according to any operation known in the art having the benefit of the disclosures herein. Example and non-limiting operations to determine the target intake air throttle pressure differential include at least determining: a pressure differential corresponding to a load threshold (e.g., 10%, 25%, etc.) which load threshold may be a maximum load, a load at a present engine speed, or other load value; a specified pressure differential in absolute terms (e.g., 20 psia, 25 psia, 30 psia, etc.); and/or a pressure differential value at which empirical testing has shown the wastegate is sufficiently responsive under a normal wastegate actuator position control scheme. A value that is "sufficiently responsive" is definable by meeting a transient requirement, by meeting an engine speed or air flow rate rise time requirement, by meeting a driveability specification, and/or by meeting a transient requirement to meet driveability, emissions, transient performance, or other system delivery requirements.

As is evident from the figures and text presented above, a variety of embodiments according to the present disclosure are contemplated.

An example set of embodiments is a method including determining a target exhaust manifold pressure for an internal combustion engine in response to a target pressure differential across an intake air throttle of the internal combustion engine, the internal combustion engine including a turbocharger with a turbine bypass and a wastegate including a controllable actuator for controlling a position of the wastegate in the turbine bypass; determining an actual exhaust manifold pressure for the internal combustion engine; determining, with feedback control, an exhaust manifold pressure correction in response to the target exhaust manifold pressure and the actual exhaust manifold pressure; determining a target effective area of opening for the wastegate to provide the exhaust manifold pressure correction; determining a wastegate actuator position command for the actuator based on the target effective area of the wastegate; and positioning the wastegate to provide the target effective area of opening in response to the wastegate actuator position command.

In one embodiment, the internal combustion engine includes a charge air cooler upstream of the intake air throttle and downstream of a compressor of the turbocharger. In another embodiment, the target effective area of opening for the wastegate is based on an exhaust gas flow through the turbine, the measured exhaust manifold pressure, an exhaust manifold temperature, and a turbine outlet temperature.

In yet another embodiment, the method includes determining a target compressor outlet pressure for a compressor of the turbocharger based on a target pressure downstream of the intake air throttle and the target pressure differential across the intake air throttle. In a refinement of this embodiment, the method includes determining the target exhaust manifold pressure in response to the target compressor outlet pressure and an intake air flow to the internal combustion engine. In a further refinement of the method, determining the target exhaust manifold pressure further includes determining the target exhaust manifold pressure based on a turbine inlet temperature, a compressor inlet temperature, a compressor inlet pressure, a turbine inlet pressure, and an exhaust gas flow through the turbine. In another embodiment, the target exhaust pressure can be modified based on EGR flow/fraction or EGR valve position if the current engine pressure drop is not sufficient to drive the require EGR flow.

Another example set of embodiments is directed to a method that includes: determining, with an electronic controller, a wastegate actuator position command that controls an actuator to position a wastegate in a turbine bypass of a turbocharger of an internal combustion engine to provide a target effective area of opening of the wastegate in response to a target pressure differential across an intake air throttle of the internal combustion engine; and positioning the wastegate in response to the wastegate actuator position command to provide the target effective area of opening for the wastegate.

In one embodiment, the method includes: determining a target exhaust manifold pressure for the internal combustion engine in response to the target pressure differential across the intake air throttle; determining an actual exhaust manifold pressure of the internal combustion engine; and determining an exhaust manifold pressure correction in response to the target exhaust manifold pressure and the actual exhaust manifold pressure.

In one refinement of this embodiment, the exhaust manifold pressure correction is determined via feedback control of the target exhaust manifold pressure and the actual exhaust manifold pressure. In another refinement, the method includes determining a target compressor outlet pressure for a compressor of the turbocharger based on the target pressure differential across the intake air throttle and a target pressure downstream of the intake air throttle. In a further refinement, the target exhaust manifold pressure is further determined in response to the target compressor outlet pressure for the compressor and an intake air flow to the internal combustion engine. In yet a further refinement, the method includes determining the target exhaust manifold pressure in response to an inlet temperature of a turbine of the turbocharger, an inlet temperature of the compressor, an inlet pressure of the turbine, and an inlet pressure of the compressor.

In another embodiment, the target effective area of the wastegate is based on an exhaust gas flow through a turbine of the turbocharger, the measured exhaust manifold pressure, an exhaust manifold temperature of the internal combustion engine, and a turbine outlet temperature of the turbine.

Another set of embodiments is directed to a system that includes an internal combustion engine pneumatically coupled to a compressor of a turbocharger on an inlet side of the engine and to a turbine of the turbocharger on an outlet side of the engine. The inlet side of the internal combustion engine further includes an intake air throttle. The turbocharger includes a wastegate connected to a wastegate actuator responsive to a wastegate actuator position command, and the wastegate being positioned in a bypass of the turbine. The system also includes a controller configured to determine the wastegate actuator command to position the wastegate in the bypass to provide a target effective area of opening of the wastegate in response to a pressure differential across the intake air throttle of the internal combustion engine, and to provide the wastegate actuator position command to the wastegate actuator to position the wastegate in response to the wastegate position actuator command.

In one embodiment, the controller is further configured to determine a target exhaust manifold pressure for the internal combustion engine in response to the pressure differential across the intake air throttle; determine an actual exhaust manifold pressure of the internal combustion engine; and determine an exhaust manifold pressure correction in response to the target exhaust manifold pressure and the actual exhaust manifold pressure.

In a refinement of this embodiment, the controller is configured to determine the exhaust manifold pressure correction via feedback control, such as linear feedback control. In another refinement of this embodiment, the controller is configured to determine the target effective area in response to the exhaust manifold pressure correction.

In another embodiment, the controller is further configured to determine the target exhaust manifold pressure in response to: a target compressor outlet pressure that is based on the pressure differential across the intake air throttle and a target intake air pressure downstream of the intake air throttle; an intake air flow to the internal combustion engine; an inlet temperature of the turbine; an inlet temperature of the compressor; an inlet pressure of the turbine; and an inlet pressure of the compressor.

In yet another embodiment, the system includes a charge air cooler between the intake air throttle and the compressor of the turbocharger. In still another embodiment, the system includes an exhaust gas recirculation system connecting the inlet and outlet sides of the engine.

Another set of embodiments include a controller apparatus configured to determine a wastegate actuator command to position a wastegate in a turbine bypass to provide a target effective area of opening of the wastegate in response to a pressure differential across an intake air throttle of an internal combustion engine, and to provide the wastegate actuator position command to a wastegate actuator to position the wastegate in response to the wastegate position actuator command.

While the invention has been illustrated and described in detail in the drawings and foregoing description, the same is to be considered as illustrative and not restrictive in character, it being understood that only certain example embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining a target exhaust manifold pressure for an internal combustion engine in response to a target pressure differential across an intake air throttle of the internal combustion engine, the internal combustion engine including a turbocharger with a turbine bypass and a wastegate including a controllable actuator for controlling a position of the wastegate in the turbine bypass;
   determining an actual exhaust manifold pressure for the internal combustion engine;
   determining, with feedback control, an exhaust manifold pressure correction in response to the target exhaust manifold pressure and the actual exhaust manifold pressure;
   determining a target effective area of opening for the wastegate to provide the exhaust manifold pressure correction;
   determining a wastegate actuator position command for the actuator based on the target effective area of the wastegate; and
   positioning the wastegate to provide the target effective area of opening in response to the wastegate actuator position command.

2. The method of claim 1, wherein the internal combustion engine includes a charge air cooler upstream of the intake air throttle and downstream of a compressor of the turbocharger.

3. The method of claim 1, further comprising determining a target compressor outlet pressure for a compressor of the turbocharger based on a target intake pressure downstream of the intake air throttle and the target pressure differential across the intake air throttle.

4. The method of claim 3, further comprising determining the target exhaust manifold pressure in response to the target compressor outlet pressure and an intake air flow to the internal combustion engine.

5. The method of claim 4, wherein determining the target exhaust manifold pressure further includes determining the target exhaust manifold pressure in response to a turbine inlet temperature, a compressor inlet temperature, a compressor inlet pressure, a turbine outlet pressure, and an exhaust gas flow through the turbine.

6. The method of claim 1, wherein the target effective area of opening for the wastegate is based on an exhaust gas flow through the turbine, the target exhaust manifold pressure, an exhaust manifold temperature, and a turbine outlet pressure.

7. A method, comprising:
determining, with an electronic controller, a wastegate actuator position command that controls an actuator to position a wastegate in a turbine bypass of a turbocharger of an internal combustion engine to provide a target effective area of opening of the wastegate, wherein the target effective area of opening of the wastegate is determined in response to a target exhaust manifold pressure that is determined in response to a target pressure differential across an intake air throttle of the internal combustion engine; and
positioning the wastegate in response to the wastegate actuator position command to provide the target effective area of opening for the wastegate.

8. The method of claim 7, further comprising:
determining an actual exhaust manifold pressure of the internal combustion engine; and
determining an exhaust manifold pressure correction in response to the target exhaust manifold pressure and the actual exhaust manifold pressure.

9. The method of claim 8, wherein the exhaust manifold pressure correction is determined via feedback control of the target exhaust manifold pressure and the actual exhaust manifold pressure.

10. The method of claim 8, further comprising determining a target compressor outlet pressure for a compressor of the turbocharger based on the target pressure differential across the intake air throttle and a target intake pressure downstream of the intake air throttle.

11. The method of claim 10, wherein the target exhaust manifold pressure is further determined in response to the target compressor outlet pressure for the compressor and an intake air flow to the internal combustion engine.

12. The method of claim 11, further comprising determining the target exhaust manifold pressure in response to an inlet temperature of a turbine of the turbocharger, an inlet temperature of the compressor, an outlet pressure of the turbine, and an inlet pressure of the compressor.

13. The method of claim 7, wherein the target effective area of the wastegate is based on an exhaust gas flow through a turbine of the turbocharger, the target exhaust manifold pressure, an exhaust manifold temperature of the internal combustion engine, and a turbine outlet pressure of the turbine.

14. A system, comprising:
an internal combustion engine pneumatically coupled to a compressor of a turbocharger on an inlet side of the engine and to a turbine of the turbocharger on an outlet side of the engine, the inlet side of the internal combustion engine further including an intake air throttle;
the turbocharger comprising a wastegate connected to a wastegate actuator responsive to a wastegate actuator position command, the wastegate being positioned in a bypass of the turbine; and
a controller configured to determine the wastegate actuator position command to position the wastegate in the bypass to provide a target effective area of opening of the wastegate, wherein the target effective area of opening of the wastegate is determined in response to a target exhaust manifold pressure that is determined in response to a target pressure differential across the intake air throttle of the internal combustion engine, and to provide the wastegate actuator position command to the wastegate actuator to position the wastegate in response to the wastegate actuator position command.

15. The system of claim 14, wherein the controller is further configured to:
determine an actual exhaust manifold pressure of the internal combustion engine; and
determine an exhaust manifold pressure correction in response to the target exhaust manifold pressure and the actual exhaust manifold pressure.

16. The system of claim 15, wherein the controller is configured to determine the exhaust manifold pressure correction via feedback control.

17. The system of claim 15, wherein the controller is configured to determine the target effective area in response to the exhaust manifold pressure correction.

18. The system of claim 15, wherein the controller is further configured to determine the target exhaust manifold pressure in response to:
a target compressor outlet pressure that is determined in response to the target pressure differential across the intake air throttle and a target intake pressure downstream of the intake air throttle;
at least one of an intake air flow, a charge flow and an exhaust gas recirculation flow to the internal combustion engine;
an inlet temperature of the turbine;
an inlet temperature of the compressor;
an outlet pressure of the turbine;
an inlet pressure of the compressor; and
an intake air throttle position.

19. The system of claim 14, further comprising a charge air cooler between the intake air throttle and the compressor of the turbocharger.

20. The system of claim 14, further comprising an exhaust gas recirculation system connecting the inlet and outlet sides of the engine.

* * * * *